United States Patent [19]

Maruoka

[11] 3,776,205
[45] Dec. 4, 1973

[54] IGNITION TIMING CONTROL SYSTEM
[75] Inventor: Hiroyuki Maruoka, Yokohama, Japan
[73] Assignee: Nissan Motor Company, Limited, Kanagawa-ku, Yokohama City, Japan
[22] Filed: Jan. 20, 1972
[21] Appl. No.: 219,400

[30] Foreign Application Priority Data
July 29, 1971  Japan............................... 46/57013

[52] U.S. Cl. .... 123/117 R, 123/179 BG, 123/117 A
[51] Int. Cl............................................. F02p 5/04
[58] Field of Search.................... 123/117 A, 117 R, 123/146.5 A

[56] References Cited
UNITED STATES PATENTS
| | | | |
|---|---|---|---|
| 3,626,455 | 12/1971 | Toda............................... | 123/117 R |
| 3,687,120 | 8/1972 | Lenz............................... | 123/117 R |
| 3,547,088 | 12/1970 | Yagi............................... | 123/117 R |
| 3,665,904 | 5/1972 | Goodwillie..................... | 123/117 R |
| 3,643,526 | 2/1972 | Thornburgh.................... | 123/117 R |
| 3,581,852 | 6/1971 | Griffin............................ | 123/117 R |
| 3,593,693 | 7/1971 | Seelmann....................... | 123/117 R |

*Primary Examiner*—Laurence M. Goodridge
*Assistant Examiner*—Ronald B. M. Cox
*Attorney*—John Lezdey

[57] ABSTRACT

An ignition timing control system for a spark ignited internal combustion engine of an automotive vehicle which engine includes a carburetor throttle valve. The system includes a d.c. voltage source, a throttle opening device connected to the voltage source for opening the carburetor throttle valve when it is energized. The throttle valve opening device is energized during neutral condition of the automotive vehicle when the engine is cold. The system further includes a relay connected to the voltage source, an ignition coil connected to the relay, and a distributor including an advancing breaker point connected through the ignition coil to the relay and a retarding breaker point connected to the relay, whereby an electric current path from the voltage source through the relay to the retarding breaker point is established while the carburetor throttle valve is opened by the actuation of the throttle valve opening device for thereby effecting faster warm up of the engine to prevent air pollution.

3 Claims, 5 Drawing Figures

IGNITION TIMING CONTROL SYSTEM

This invention relates in general to air pollution preventive systems and more particularly to an air pollution preventive system of the type having an ignition timing control system adapted to be used in an automotive spark ignited internal combustion engine to reduce the amount of noxious components in engine exhaust gases emitted from an automotive engine exhaust system.

An automotive spark ignited internal combustion engine commonly includes a governor advance mechanism for controlling the ignition spark timing of the engine to provide a satisfactory performance efficiency of the engine over a wide range of engine operations. In this governor advance mechanism, it is a usual practice to retard the ignition spark timing of the engine in order to reduce the amount of noxious components or harmful air pollutants such as unburned hydrocarbons and carbon monoxides contained in engine exhaust gases. The governor advance mechanism, which has heretofore been proposed, is so arranged as to vary the ignition spark timing of the engine in proportion to variations in engine speed. Accordingly, the ignition spark timing retards as the engine speed decreases while the same advances as the engine speed increases. With this arrangement, some difficulties are encountered in that engine stall and knocking phenomena will frequently take place especially when the ignition spark timing is retarded after starting of the engine. Another difficulty encountered is that the engine lacks stability in operation due to variations in ambient temperature and in air-fuel ratio of an air-fuel mixture to be supplied to the engine. A further difficulty encountered is that since the engine is not started until the ignition spark timing is advanced to some extent, the ignition spark timing should be initially advanced and subsequently retarded thus requiring an additional sensing means to be mounted in the governor advance mechanism for sensing a suitable timing to effect shifting from advanced to retarded conditions.

It is, therefore, an object of the present invention to provide an improved and simple ignition timing control system for use in an automative spark ignited internal combustion engine, the system being adapted to reduce the amount of air pollutants in engine exhaust gases.

Another object of the present invention is to provide an improved ignition timing control system adapted to ensure stability of engine operation.

A still another object of the present invention is to provide an improved ignition timing control system for effecting faster warm up to effectively eliminate air pollution.

A further object of the present invention is to provide an improved ignition timing control system which speed up the warming up of the engine and reduces the unburned hydrocarbons in the engine exhaust gases during the warm up period.

A still further object of the present invention is to provide an improved ignition timing control system which reduces the engine warm-up time for thereby increasing performance efficiency of an air pollution preventive device such as thermal reactor.

A still further object of the present invention is to provide an improved ignition timing control system which is adapted to reduce the time required for warming up an internal combustion engine by maintaining the spark ignition timing retard thereby to improve the performance efficiency of the engine.

In order to achieve these objects, the present invention contemplates to provide a ignition timing control system adapted to be used in a spark ignited internal combustion engine having a carburetor throttle valve. The spark advance control system is comprised of a throttle valve opening device connected to a d.c. voltage source. The throttle valve opening device is made responsive to a cold engine temperature and neutral condition of the automotive vehicle for opening the carburetor throttle valve thereby to increase the engine speed under these circumstances. While the throttle valve is opened, the ignition spark timing of the engine is retarded to effect faster warm up of the engine for increasing the temperature of engine exhaust gases for thereby reducing noxious components such as hydrocarbons and carbon monoxide in the engine exhaust gases. To this end, a relay is provided which is electrically connected to the d.c. voltage source. The relay is electrically connected to an ignition coil, between which an advancing breaker point of a distributor is electrically connected. The distributor also includes a retarding breaker point which is connected to the relay so that an electric current path from the voltage source to the retarding breaker point is established to effect retarding of the ignition spark timing of the engine. The distributor features that the ignition spark timing of the engine retards as the engine speed increased thereby to provide stability in engine operation during cold engine temperature or light load operating condition of the engine. In a preferred embodiment of the present invention, the distributor is comprised of a drive shaft driven by a crank shaft of the engine at a proper speed. A rotary plate is fixedly mounted on the drive shaft and rotatable therewith. First and second governor weights are pivotally mounted on the rotary plate and associated therewith in such a manner that the governor weights are caused to swing around respective pivot pins firmly affixed on a surface of the rotary plate due to centrifugal forces exerted on the governor weights. The first and second governor weights are biased by first and second tension springs which are appropriately adjusted to provide appropriate amounts of spark advance and retard. The governor weights are associated with first and second guide members which are formed with guide slots, respectively. To transmit swinging movements of the governor weights to the guide members, first and second guide pins are operatively disposed in the first and second guide slots formed in the guide members. The guide pins are fixedly mounted on the first and second governor weights at their respective end portions. The first guide member is connected to a first distributor cam associated with the advancing breaker point, while the second guide member is connected to a second distributor cam associated with the retarding breaker point. With this construction, as the engine speed reaches a predetermined speed thereby rotating the rotary plate, the first and second governor weights are caused to swing around the associated pivot pins due to the centrifugal forces exerted thereon against the forces of the tension springs. When this takes place, the first guide member is caused to rotate counterclockwise to actuate the advancing breaker point to effect advancing the ignition spark timing, whereas the second guide member is caused to rotate clockwise and the second distributor cam is rotated in the same direction as the guide member to actuate the retarding breaker point for thereby retarding the ignition spark timing.

These and other objects and advantages of the present invention will become more apparent from the following description taken in conjunction with the accompanying drawings, in which.

Figure 1:
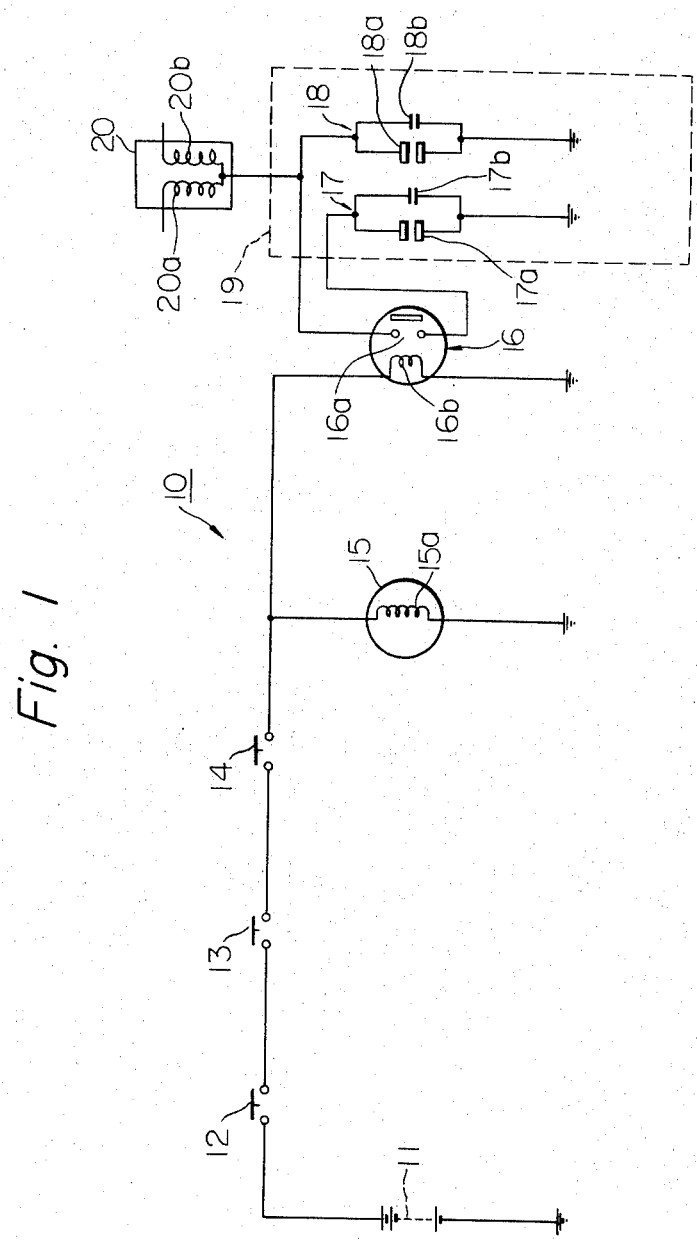
FIG. 1 is a schematic view of a ignition timing control system according to the present invention.

Referring now to the drawings and more particularly to FIG. 1, there is schematically shown a ignition timing control system embodying the present invention, which system is generally designated by reference numeral 10. The ignition timing control system 10 is specifically suited for use in an automotive spark ignited internal combustion engine, though not shown. As shown, the ignition timing control system 10 includes a d.c. voltage source or battery 11, which is electrically connected to an ignition switch 12. The ignition switch 12 is electrically connected in series to a thermostatically controlled switch 13 which may be of any suitable construction. The thermostatically controlled switch 13 is arranged to sense engine temperature, for example, cooling liquid, engine oil or engine body itself so as to close the electric circuit forming part of the spark advance control system 10 when the engine temperature is below its normal operating temperature. The thermostatically controlled switch 13 is in turn electrically connected in series to a neutral switch 14 which may be of known suitable construction insofar as it functions to close the electric circuit when the automotive vehicle is maintained in its neutral condition. A throttle opening device 15 is provided for opening an engine carburetor throttle valve (not shown) at a suitable angle thereby to increase the engine speed when it is energized. The throttle opening device 15 may be constructed in a known manner and consists of a solenoid coil 15a having a terminal connected in parallel with the voltage source 11 through serially connected switches 12, 13 and 14 and the other terminal connected to the ground. Also connected to the neutral switch 14 is a relay 16, which includes a switch contact 16a which is normally kept open and a solenoid coil 16b associated therewith and having one end connected in series to the voltage source 11 through switch 12, 13 and 14 connected in series and the other end connected to the ground. The switch contact 16a of the relay 16 is comprised of a pair of stationary contacts (not identified) which are electrically connected to a retarding breaker point 17 and a advancing breaker point 18, respectively, which are connected in parallel to said switch contact 16a of the relay 16. Each of these breaker points 17 and 18 consists of a breaker contact 17a or 18a and a condenser 17b or 18b, which are connected to the ground. The breaker points 17 and 18 constitute component parts of a distributor, generally indicated at 19, which forms a main part of the ignition timing control system 10 of the present invention. An ignition coil 20 is connected between the relay 16 and the advancing breaker contact 18. The ignition coil 20 has a primary side 20a connected to the ignition switch and a secondary side connected to a spark plug (not shown).

Before entering into detail description of operation of the spark advance control system, let it be assumed that the ignition switch 12 is closed to start the engine (not shown). During warm up operation of the engine, the engine temperature is usually below a predetermined level so that the thermostatically controlled switch 13 is closed due to its inherent construction. When, in this instance, the neutral switch 14 is closed, a current path from the battery 11 to the throttle opening device 15 and the relay 16 is established. Consequently, the throttle opening device 15 is energized to open the engine carburetor throttle valve at the suitable angle to increase the engine speed, whereas the solenoid coil 16b of the relay 16 is energized to close the switch 16a thereof. With the swith 16a closed, the retarding breaker circuit is completed so that the ignition spark timing is retarded thereby energizing the ignition coil 20 at the retarded ignition spark timing. This retard of ignition spark timing, when the engine is cold, speeds up the warming up of the engine thereby effecting faster warm up of the reactor to reduce the unburned hydrocarbons and carbone monoxides in the engine exhaust gases. It is to be noted that the engine exhaust gases are heated to an appropriate temperature to reduce the hydrocarbon contents therein due to faster warm up condition of the engine. Thus the air pollution is prevented in a satisfactory fashion during the warm up period of the engine.

When the temperature exceeds the predetermined level, the thermostatically controlled switch 13 is opened so that the current path from the battery 11 to the throttle opening device 15 and the relay 16 is interrupted. Accordingly, the ignition spark timing of the engine is advanced by the aid of advancing breaker point 18 of the distributor 19 and, therefore, the engine is operated at its maximum performance efficiency for the reason which will be discussed in detail hereinafter.

According to an important feature of the present invention, the distributor 19 forming main part of the ignition timing control system 10 is so constructed as to initially maintain the ignition spark timing advanced at a suitable angle for stabilizing the engine operation when the engine is operated at a speed below a predetermined level and subsequently to retard the ignition spark timing with the increase in engine speed for effecting faster warm up of the engine when the engine speed reaches the predetermined level. As previously discussed, the retarding operation of the distributor 19 is initiated only when the retarding electric circuit is established in the ingnition timing control system 10.

Figure 2:
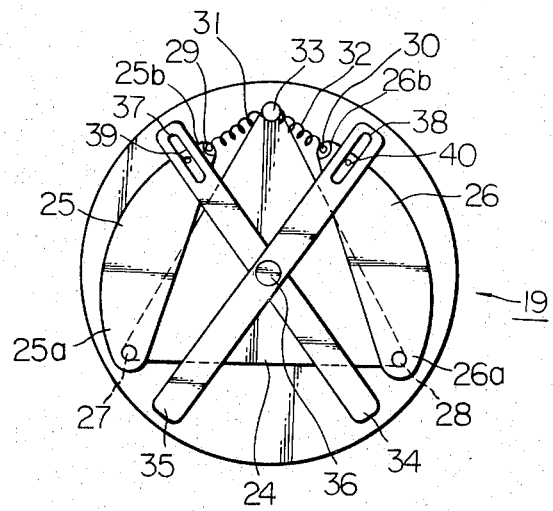
FIG. 2 is a plan view of a distributor incorporated in the ignition timing control system of FIG. 1.
Figure 3:
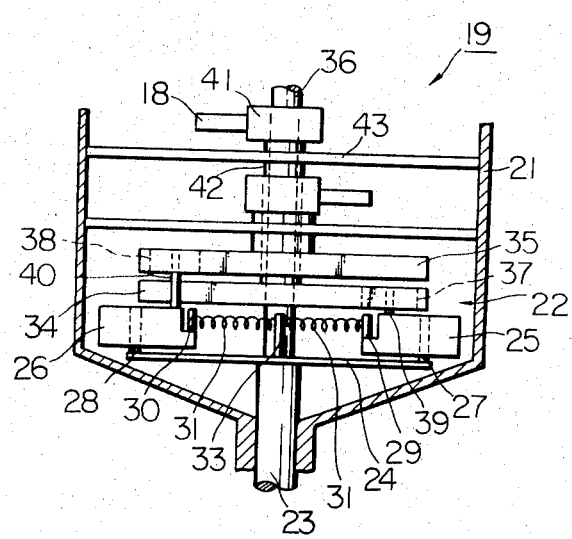
FIG. 3 is a sectional view of the distributor shown in FIG. 1.

FIGS. 2 and 3 illustrate in detail the construction of the distributor 19 as previously discussed. As shown, the distributor 19 is comprised of a housing 21 in which a distributor assembly 22 is operatively mounted. The distributor assembly 22 consists of a drive shaft 23 which may be connected to and driven by a crank shaft (not shown) of the engine. A governor weight base or rotary plate 24 is fixedly mounted on the drive shaft 23 and rotatable therewith. First and second governor weights 25 and 26 are pivoted respectively on pivot pins 27 and 28 at their respective end portions 25a and 26a which pins are firmly affixed to a surface (not identified) of the rotary plate 24. The first and second governor weights 25 and 26 are formed with pins 29 and 30, respectively, at their respective other end portions 25b and 26b. The first governor weight 25 acts as an element for effecting advance of the ignition spark timing, whereas the second governor weight 26 acts as an element to retard the ignition spark timing. First and second tension springs 31 and 32 are provided for biasing the governor weights 25 and 26 and retained by means of a retaining pin 33 at their respective other end portions 25b and 26b. The retaining pin 33 is secured on the surface of the rotary plate 24. In this manner, the advancing and retarding governor weights 25 and 26 are held in biased condition. First and second guide members 34 and 35 are rotatably mounted on a common shaft 36 at the intermediate portions thereof, the common shaft being coaxial with said driven shaft 23. The first and second guide members 34 and 35 have formed therein guide slots 37 and 38 with which first and second guide pins 39 and 40 are engaged. The guide pins 39 and 40 are fixedly mounted on the governor weights 25 and 26, respectively. This guide pin and guide slot arrangement has the function of limiting the amount of retard and advance that the ignition timing control system of the type above set forth has in operation. A first distributor cam 41 is integrally connected to the guide member 34 by means of a hollow shaft 42 and driven thereby for actuating the advancing breaker point 18, incorporated in the ignition timing control system 10 (see FIG. 1). Likewise, a second distributor cam 43 is integrally connected to the guide member 35 by means of a hollow shaft 44 which is rotatably disposed in the hollow shaft 42. The second distributor cam 43 is associated with the retarding breaker point 17 provided in the ignition timing control system 10 (see FIG. 1).

It will be appreciated that the degree of advance in the ignition spark timing of the engine may be predetermined by appropriately adjusting the force of the spring 31 and by varying the mass of the governor weight 25. The same principle will be applied to the tension spring 32 and the governor weight 26 associated therewith for varying the degree of retard of the ignition spark timing of the engine.

When the engine is started, the drive shaft 23 of the distributor 19 is driven at a proper speed by the crank shaft (not shown) of the engine so that the rotary plate 24 is caused to rotate. As the engine is operated at a speed below a predetermined level, the centrifugal force exerted on the governor weight 25 is not sufficient to overcome the force of the tension spring 31. Consequently, the guide member 34 associated with the governor weight 25 remains stationary and the distributor cam 41 connected to the guide member 34 also remains stationary. As a result, the ignition spark timing is maintained in the advanced condition so that the engine stall and knocking phenomena do not occure. At this engine speed, the centrifugal force exerted on the weight 26 is not sufficient to overcome the force of the tension spring 32 so that the guide member 35 and accordingly the distributor cam 43 remains stationary. Accordingly, the ignition spark timing is not retarded. However, as the engine speed reaches the predetermined level, the governor weight 25 is caused to swing around the pivot pin 27. When this takes place, the guide pin 39 is caused to slide in the guide slot 37 formed in the guide member 34 thereby rotating the guide member 34 counterclockwise. With the guide member 34 rotated counterclockwise, the distributor cam 43 connected to the guide member 34 is rotated in the same direction as the guide member 34 thereby actuating the advancing breaker point 18 so that the ignition spark timing of the engine is advanced as shown by a curve a in FIG. 4. In a similar manner, the governor weight 26 is caused to swing about the pivot pin 28. In this instance, the guide pin 40 connected to the governor weight 26 slides in the guide slot 38 formed in the guide member 35 thereby rotating the guide member 35 clockwise. The distributor cam 43 connected by means of the hollow shaft 44 to the guide member 35 is caused to rotate therewith thereby actuating the retarding breaker point 17 so that the ignition spark timing is retarded as shown by a curve b in FIG. 4.

Figure 4:
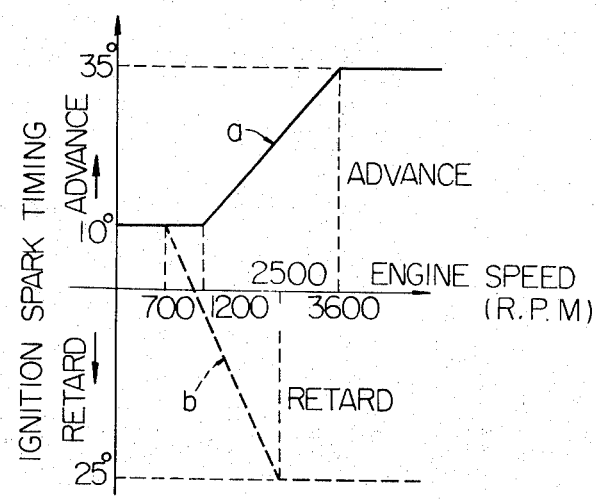
FIG. 4 is a graphical representation of an example of spark advance retard curve which is attained with the use of ignition timing control system shown in FIG. 1.

FIG. 4 illustrates a preferred example of the advancing and retarding characteristics of the ignition spark timing of the engine which are attained with the use of the spark advance control system of the present invention. As shown in FIG. 4, if the ignition spark timing is set to provide 10° ignition spark advance before T. D. C. where the engine speed is around 1,200 r.p.m. while providing 35° of spark advance where the engine speed is at 3,600 r.p.m., then it is preferable to advance the ignition spark timing to 10° before T. D. C. when the engine is operated at a speed of 700 r.p.m. and to retard the ignition spark timing to 25° after T. D. C. at a speed of 2,500 r.p.m. during idling or light load operating condition of the engine when the engine temperature is below the normal operating temperature. Thus, the temperature of the engine exhaust gases increases because of the faster warm up of the engine due to retarded ignition spark timing thereby reducing the unburned hydrocarbon and carbon monoxide contents in the engine exhaust gases.

Figure 5:
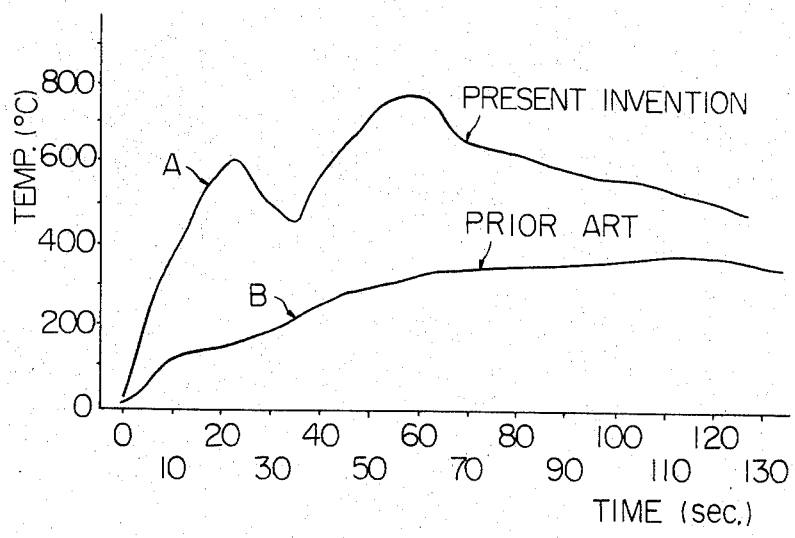
FIG. 5 is a view illustrating variations in temperature of engine exhaust gases.

FIG. 5 illustrates relationships between temperatures of the engine exhaust gases and the time required for increasing the temperature thereof. The curve A indicates the variations in temperature of the engine exhaust gases with the use of the ignition timing control system according to the present invention and the curve B indicates the variations of the tempeature of the exhaust gases through the use of the prior art governor advance mechanism. It is seen from the graph of FIG. 5 that the temperature of the exhaust gases where the engine is equipped with the ignition timing control system of the present invention is considerably higher than that where the conventional governor advance mechanism is employed.

It will now be understood that the ignition timing control system implementing the present invention is advantageous in preventing air pollution since the retard of the ignition spark timing of the engine will cause a faster warm up of the engine thereby to increase the temperature of the engine exhaust gases.

It will also be noted that since the ignition spark timing retards as the engine speed increases, engine stall and knocking are avoided to provide a stabilized engine operation during light load condition of the engine.

What is claimed is:

1. An ignition timing control system for a spark ignited internal combustion engine having a carburetor throttle valve, said system comprising, in combination, a d.c. voltage source, a thermostatically controlled switch electrically connected to said d.c. voltage source and responsive to the engine temperature, a throttle opening device electrically connected through said thermostatically controlled switch to said d.c. voltage source and opening said carburetor throttle valve when said throttle opening device is energized, a relay electrically connected through said thermostatically controlled switch to said d.c. voltage source, an ignition coil electrically connected to said relay, and a distributor including an advancing breaker point and a retarding breaker point electrically connected to said ignition coil and said relay, said distributor having means responsive to engine speed for effecting ignition timing advance until the engine speed reaches a predetermined level when said thermostatically controlled switch is closed and effecting ignition timing retard when the engine speed exceeds said predetermined level, said thermostatically controlled switch being closed when said engine temperature is below a normal operating level whereby said throttle opening device is energized to open said carburetor throttle valve thereby to increase said engine speed whereas said means of said distributor is operated to effect ignition timing advance until the engine speed reaches said predetermined level and thereafter to effect ignition timing retard for thereby effecting faster warm up of said engine.

2. An ignition timing control system for a spark ignited internal combustion engine of an automotive vehicle which engine has a carburetor throttle valve, said system comprising in combination, a d.c. voltage source, an ignition switch electrically connected to said d.c. voltage source, a thermostatically controlled switch electrically connected to said ignition switch and responsive to the engine temperature, a neutral switch electrically connected to said thermostatically controlled switch and closed when said automotive vehicle is maintained in its neutral condition, a throttle opening device electrically connected to said d.c. voltage source through said ignition switch, said thermostatically controlled switch and said neutral switch and opening said carburetor throttle valve when said throttle opening device is energized, a relay including a solenoid coil electrically connected in series to said d.c. voltage source through said serially connected switches and a swtich contact associated with said solenoid coil and movable to a closed position when coil is energized, an ignition coil electrically connected to said switch contact of said relay, and a distributor having a retarding breaker point and an advancing breaker point which are electrically connected in parallel to said switch contact of said relay, said distributor having first means to effect ignition timing advance when the engine temperature reaches a normal operating level and second means to effect ignition timing advance until the engine speed reaches a predetermined level when said thermostatically controlled switch is closed and to effect ignition timing retard when the engine speed exceeds said predetermined level, said thermostatically controlled switch being closed when the engine temperature is below said normal operating level for establishing an electric current path between said d.c. voltage source and said ignition coil through said retarding breaker point of said distributor, whereby said second means initially effects ignition timing advance until the engine speed reaches said predetermined level and subsequently effects ignition timing retard when the engine speed exceeds said predetermined level and whereby said throttle opening device is energized to open said carburetor throttle valve to increase said engine speed for effecting faster warm up of said engine.

3. An ignition timing control system for a spark ignited internal combustion engine for an automotive vehicle which engine includes a carburetor throttle valve, said system comprising, in combination, a d.c. voltage source, an ignition switch electrically connected to said voltage source, a thermostatically controlled switch electrically connected to said voltage source through said ignition switch and responsive to the engine temperature, said thermostatically controlled switch being closed when said engine temperature is below a normal opening level, a neutral swtich electrically connected through said serially connected ignition swtich and said thermostatically connected switch to said voltage source, said neutral switch being closed when said automotive vehicle is maintained in a neutral condition, a throttle opening device provided for opening said carburetor throttle valve and including a solenoid coil having one terminal electrically connected through said serially connected ignition switch, said thermostatically controlled switch and said neutral switch to said voltage source and the other terminal connected to the ground, a relay including a solenoid coil connected in series to said voltage source through said serially connected switches and a switch contact associated with said solenoid coil and movable to a closed position when said coil is energized, an ignition coil connected to said switch contact, and a distributor having a retarding breaker point and an advancing breaker point connected in parallel to said switch contact, said distributor including a housing, a drive shaft disposed in said housing, a rotary plate fixedly mounted on said rotary plate and rotatable therewith, first and second governor weights pivoted respectively on pivot pins which are fixedly secured to a surface of said rotary plate, first and second tension springs disposed between a retaining pin secured on the surface of said rotary plate and said first and second governor weights respectively, first and second guide pins fixedly mounted on the first and second governor weights respectively, first and second guide members pivotally mounted on a common shaft coaxial with said drive shaft, said first and second guide members having guide slots respectively in which said first and second guide pins are respectively engaged, and first and second distributor cams integrally connected to said first and second guide members respectively, said first distributor cam being associated with said advancing breaker point and said second distributor cam being associated with said retarding breaker point, said first governor weight and said first tension spring being arranged to effect ignition timing advance in dependence on the engine speed, and said first governor weight and said first tension spring being arranged to effect ignition timing advance until the engine speed reaches a predetermined level when said engine temperature is below said normal operating level, and said second governor weight and said second spring being arranged to effect ignition timing retard in dependence on the engine speed after said engine speed reaches said predetermined level.

\* \* \* \* \*